(12) United States Patent
Mattozzi et al.

(10) Patent No.: US 8,366,484 B2
(45) Date of Patent: Feb. 5, 2013

(54) DEVICE FOR ELECTRIC CONNECTION, A METHOD FOR PRODUCING SUCH A DEVICE, AND AN ELECTRIC INSTALLATION

(75) Inventors: Alessandro Mattozzi, Sundyberg (SE); Patrik Roseen, Vasteras (SE); Robert Espeseth, Skien (NO); Gunn-Kristin Sonsteby, Skien (NO); Paal Kristian Skryten, Skien (NO); Ole Granhaug, Skien (NO); Thor Endre, Skien (NO); Tom-Rune Bjortuft, Porsgrunn (NO); Dariusz Bednarowski, Krakow (PL); Lukasz Malinowski, Krakow (PL)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/350,417

(22) Filed: Jan. 13, 2012

(65) Prior Publication Data

US 2012/0178293 A1 Jul. 12, 2012

Related U.S. Application Data

(63) Continuation of application No. PCT/EP2010/058162, filed on Jun. 10, 2010.

(30) Foreign Application Priority Data

Jul. 15, 2009 (EP) .................................... 09165487

(51) Int. Cl.
H01R 13/648 (2006.01)
(52) U.S. Cl. .................... 439/607.01; 174/650; 174/668
(58) Field of Classification Search ............ 439/607.01, 439/607.02, 607.29, 625, 198, 936, 276, 439/519, 574; 361/679.01, 668, 650; 174/667, 174/668, 650
See application file for complete search history.

(56) References Cited

U.S. PATENT DOCUMENTS

| 3,178,505 | A | 4/1965 | Van Sickle |
| 3,257,501 | A | 6/1966 | Sauer |
| 3,604,830 | A | 9/1971 | Frakes |
| 4,458,101 | A | 7/1984 | Cookson et al. |

(Continued)

FOREIGN PATENT DOCUMENTS

| DE | 102007007498 A1 | 8/2008 |
| EP | 0381638 A2 | 8/1990 |

(Continued)

OTHER PUBLICATIONS

European Search Report; Application No. EP 09 16 5487; Issued: Oct. 21, 2009; Date Mailed: Nov. 3, 2009; 7 pages.

(Continued)

Primary Examiner — Edwin A. Leon
Assistant Examiner — Harshad Patel
(74) Attorney, Agent, or Firm — St. Onge Steward Johnston & Reens LLC

(57) ABSTRACT

A device for electric connection to an energy supply conductor for medium and/or high voltage having a voltage-carrying element with an outer periphery, and a tubular outer shell with an inner periphery, the outer shell being formed by a polymer, and along at least a part of the axial extension of the element the outer shell extends axially with a space between its inner periphery and the outer periphery of the element, at least along a section of said part of the axial extension of the element the space is filled with a filler of an electrically insulating material other than that of the outer shell. An electric installation including the device, and a method for producing the device.

21 Claims, 3 Drawing Sheets

U.S. PATENT DOCUMENTS

| | | | |
|---|---|---|---|
| 2006/0178026 A1 | 8/2006 | Borgstrom et al. | |
| 2009/0211805 A1* | 8/2009 | Roseen et al. | 174/650 |
| 2010/0258347 A1* | 10/2010 | Roseen et al. | 174/668 |
| 2010/0284133 A1* | 11/2010 | Skryten et al. | 361/679.01 |
| 2012/0178294 A1* | 7/2012 | Mattozzi et al. | 439/607.01 |

FOREIGN PATENT DOCUMENTS

| | | |
|---|---|---|
| EP | 1496576 A2 | 1/2005 |
| EP | 1845596 A1 | 10/2007 |
| EP | 1865517 A2 | 12/2007 |
| WO | 2007065912 A1 | 6/2007 |
| WO | 2008074166 A1 | 6/2008 |
| WO | 2008076058 A1 | 6/2008 |
| WO | 2009047357 A2 | 4/2009 |

OTHER PUBLICATIONS

International Preliminary Report on Patentability; Application No. PCT/EP2010/058162; Issued: Nov. 11, 2011; 17 pages.

International Search Report and Written Opinion of the International Searching Authority; Application No. PCT/EP2010/058162; Issued: Aug. 25, 2010; Mailing Date: Sep. 3, 2010; 14 pages.

Written Opinion of the International Preliminary Examining Authority; Application No. PCT/EP2010/058162; Mailing Date: Sep. 23, 2011; 7 pages.

* cited by examiner

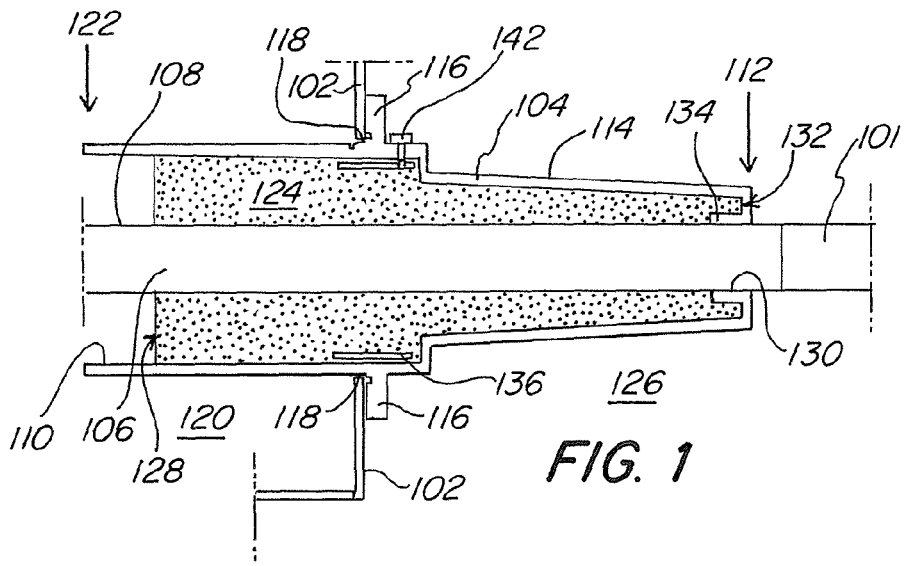
FIG. 1
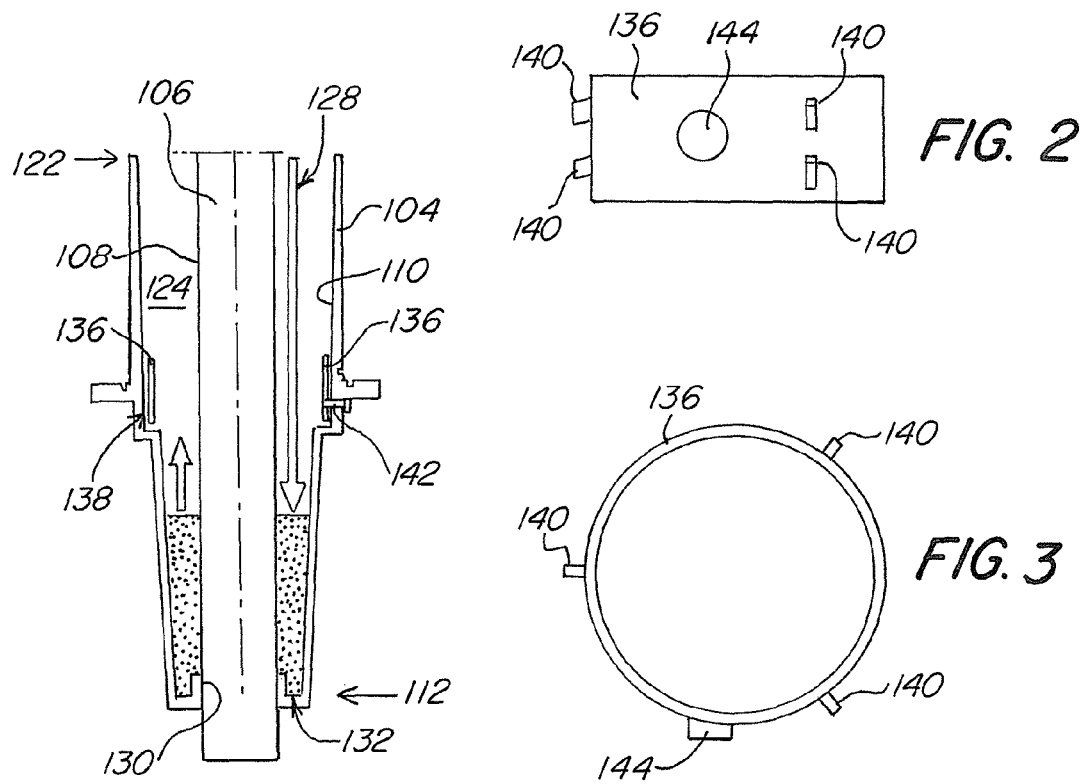
FIG. 2
FIG. 3
FIG. 4

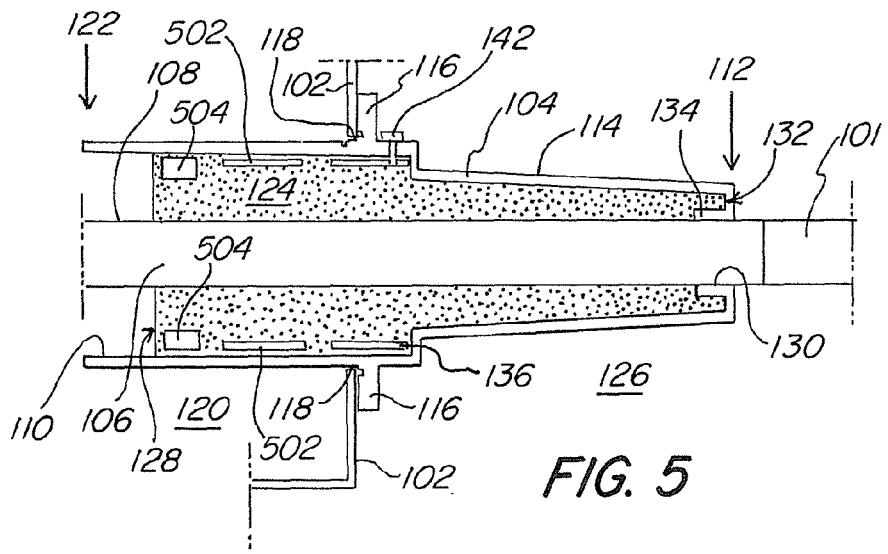
FIG. 5
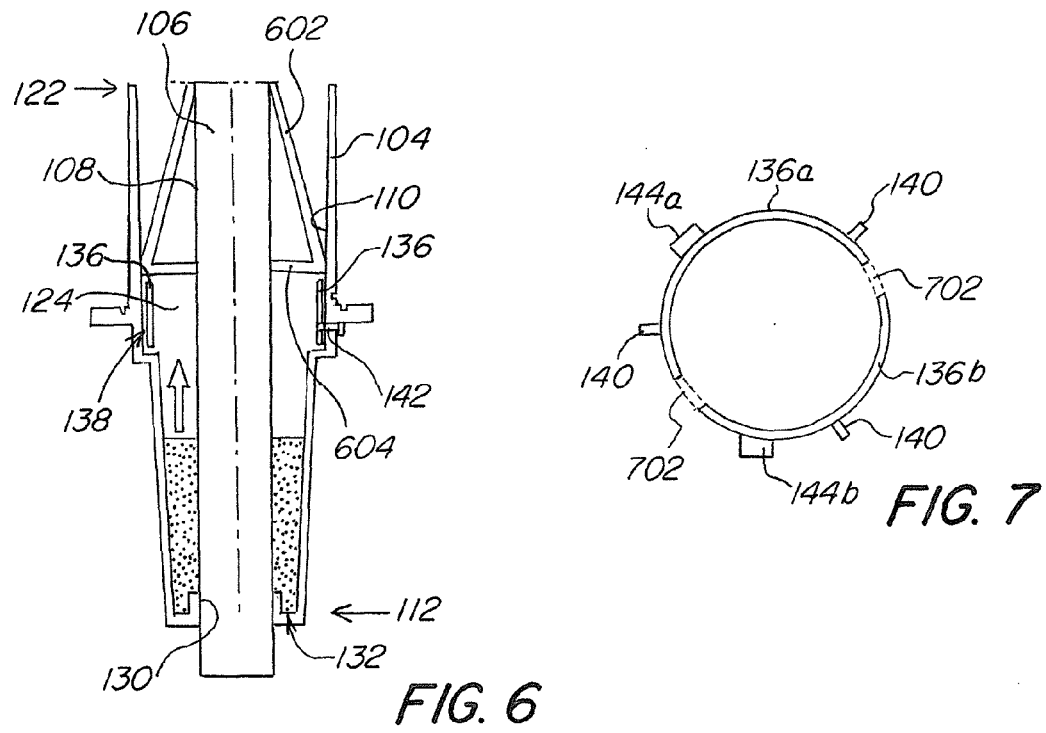
FIG. 6
FIG. 7

US 8,366,484 B2

DEVICE FOR ELECTRIC CONNECTION, A METHOD FOR PRODUCING SUCH A DEVICE, AND AN ELECTRIC INSTALLATION

CROSS-REFERENCE TO RELATED APPLICATIONS

The present application is a continuation of pending International Patent Application PCT/EP2010/058162 filed on Jun. 10, 2010 which designates the United States and claims priority from European Patent Application 09165487.1 filed on Jul. 15, 2009, the content of which is incorporated herein by reference.

FIELD OF THE INVENTION

The present invention relates to a device for electric connection to an energy supply conductor for medium and/or high voltage, e.g. 12, 24 or 36 kV, comprising a voltage-carrying element with an outer periphery, and a tubular outer shell with an inner periphery, the outer shell defining a longitudinal axis and being formed by a polymer and connected to the voltage-carrying element. The voltage-carrying element extends in the axial direction of the outer shell, and along at least a part of the axial extension of the voltage-carrying element the outer shell extends axially with a space between its inner periphery and the outer periphery of the voltage-carrying element. The outer shell is provided with an outer contact surface for connection to a wall of a container somewhere along said part of the axial extension of the voltage-carrying element, and the outer shell is adapted to separate the space from an atmosphere outside the container to which the device is connected. At least along a section of said part of the axial extension of the voltage-carrying element, the space is filled with a filler of an electrically insulating material other than that of the outer shell, the filler completely filling the space along said section. The device comprises at least one guiding element for guiding the electric field produced by the voltage-carrying element, the guiding element being at least partly conductive. The present invention also relates to a method for producing such a device, comprising the step of filling said space with a filler in a liquid state and permitting the filler to solidify. Further, the present invention relates to an electric installation, comprising such a device and a container with a wall connected to ground.

BACKGROUND OF THE INVENTION

Traditionally, electric power bushings have been made of an electric insulating part formed by a thermosetting resin, such as epoxy, moulded around an electrical conductor. The purpose of the insulation has been to prevent electric discharges between the conductor and the wall of a container through which the bushing protrudes. The thermosetting resin has been provided with a sufficiently high thickness to provide a satisfactory functionality in this respect. However, moulding thick solid bodies of thermosetting material is a costly process, and alternatives have been searched for.

U.S. Pat. No. 4,458,101 discloses a gas-insulated bushing comprising an elongated epoxy insulating shell. An inner conductor at high voltage is disposed within the shell, and an electrically insulating gas is provided in a space between the conductor and the interior face of the shell.

DE-A1-10 2007 007 498 describes a grommet having a housing of metal in which conductors are disposed. The conductors are electrically insulated from the housing by a glass body provided in a space between the conductors and the housing.

U.S. Pat. No. 3,178,505 discloses a terminal bushing with an insulating outer shell within which a conductor stud is disposed. In the space between the conductor stud and the outer shell is an insulating gas or liquid, e.g. air or oil, provided.

WO-A1-2008/074166 describes a bushing and a method for producing the same by means of a mould. The bushing has a duct for accommodating a conductor rod and comprises an insulating shell which encapsulates an electrical field grading insulation which surrounds the duct.

Instead of using a thermosetting material for the bushing, thermoplastic materials have been suggested. In U.S.— Patent Publication No. 2006/0178026 there is described an electrical connector and a method for forming the same by means of a mould, where an interface shell is formed from a thermoplastic. In EP-A2-1 496 576 a connector comprises an insulating part and an electrically conductive contact part, where the insulating part is injection molded in a thermoplastic plastic.

In prior art, it has also been suggested to let the bushing comprise a tubular body made of a thermoplastic material which is connected to the conductor and has a thin-walled outer shell which is to be connected to the wall of a gas-tight container. There is an empty space between the conductor and the outer shell of the tubular body, and the empty space is in communication with the interior of the gas-tight container, which is suggested to be filled with an electrically insulating gas, such as sulphur hexafluoride, $SF_6$. The use of thin walled bushings results in lower production costs in relation to the use thermosetting bushings of prior art.

EP-A2-0 381 638 discloses an electric conductor bushing for use in distributing plants which are insulated by the aid of insulating gas. The bushing has a tubular insulating body made of a thermoplastic and adapted to pass through a hole in the plant wall. A conductor extends coaxially through the insulating body, and the space between the conductor and the insulating body is filled with an insulating gas, e.g. $SF_6$.

WO-A1-2007/065912 discloses a grommet having an insulting body which is made of a thermoplastic and comprises an outer shell and an inner sleeve which encloses a high voltage conducting element disposed in said sleeve along the entire length of the part of the conducting element which extends through said body. The space formed between the inner sleeve and the outer shell is filled with an insulating gas.

However, the use of insulating gas alone in the space between the conductor and the outer shell might be insufficient to attain a guaranteed prevention of electric discharges emanating from the conductor. Should there be any leakage of the insulating gas from the container, a device as suggested in WO-A1-2007/065912, e.g., becomes sensitive and is likely to be subjected to electric discharges. A disadvantage of thin walls of a thermoplastic might also be that they may be subjected to diffusion of moisture from the atmosphere into the container to which the bushing is connected. To overcome these problems, it has been suggested to substitute the gas in the space between the conductor and the thermoplastic outer shell for other materials.

EP-A1-1 845 596 describes a device for electric connection to an energy supply conductor for medium and high voltage comprising an insulating part which is made of a thermoplastic polymer and includes an outer shell and an inner sleeve which encloses a conducting element disposed in said sleeve along the entire length of that part of the conducting element which extends through said insulating part. The space formed between the sleeve and the outer shell is suggested to be filled with a solid material, such as silicone rubber.

WO-A2-2009/047357 discloses a device for electric connection to an energy supply conductor for medium and high voltage comprising an insulating part which is made of a thermoplastic polymer and includes an outer shell and an inner sleeve which tightly encloses a conducting element disposed therein. The inner sleeve is connected to the outer shell by radial walls or struts which axially extend along the axial extension of the conducting element. The space between the sleeve and the outer shell is filled with a filler of an electrically insulating material other than that of the outer shell. It is suggested that the filler comprises an elastomer, or polyurethane as a main constituent. A method for producing such a device is also disclosed, which includes the step of filling said space with a filler in a liquid state and permitting the filler to solidify.

However, there is still a need for an improved bushing for medium and high voltage which is less complicated to produce in relation to the above-mentioned prior art solutions.

SUMMARY OF THE INVENTION

The object of the present invention is thus to provide an improved bushing for medium and high voltage. It is also an object of the present invention to provide an efficient method for producing a bushing for medium and high voltage. It is a further object of the present invention to provide a bushing for medium and high voltage which can be produced in an efficient way.

The above-mentioned objects of the present invention are attained by pro-viding a device for electric connection to an energy supply conductor for medium and/or high voltage, e.g. 12, 24 or 36 kV, comprising a voltage-carrying element with an outer periphery, and a tubular outer shell with an inner periphery, the outer shell defining a longitudinal axis and being formed by a polymer and connected to the voltage-carrying element, the voltage-carrying element extends in the axial direction of the outer shell, and along at least a part of the axial extension of the voltage-carrying element the outer shell extends axially with a space between its inner periphery and the outer periphery voltage-carrying element, the outer shell being provided with an outer contact surface for connection to a wall of a container somewhere along said part of the axial extension of the voltage-carrying element, the outer shell is adapted to separate the space from an atmosphere outside the container to which the device is connected, at least along a section of said part of the axial extension of the voltage-carrying element the space is filled with a filler of an electrically insulating material other than that of the outer shell, the filler completely filling the space along said section, and the device comprises at least one guiding element for guiding the electric field produced by the voltage-carrying element, the guiding element being at least partly conductive, wherein the guiding element is provided in said space.

In prior art, the guiding element, or shielding element, is moulded inside the wall of the outer shell. By placing the guiding element in said space, the production of the outer shell is radically facilitated, providing a low cost outer shell. Since the guiding element is not moulded together with the outer shell, the guiding element can be made of advantageous conductive or partly conductive materials which cannot be properly used when moulded together with the outer shell, e.g. conductive polymers. Flexibility in positioning the guiding element and selecting guiding elements made of different materials after the outer shell has been produced is also provided. Thus, the production of the device is made more flexible, providing an improved bushing for medium and high voltage, and a low-cost bushing for medium and high voltage which can be produced in an efficient way. The guiding element can be made of any suitable conductive or partly conductive material, e.g. a conductive metal, a conductive polymer etc. By the present invention, a bushing can be easily assembled and adapted to various applications. Hereby, an improved bushing for medium and high voltage is provided. The voltage-carrying element can be a conductor.

According to an advantageous embodiment of the device according to the present invention, the guiding element is axially extending and forms a screen. Hereby, an efficient shielding is provided.

According to a further advantageous embodiment of the device according to the present invention, the guiding element is situated somewhere along said section of said part of the axial extension of the voltage-carrying element.

According to an advantageous embodiment of the device according to the present invention, the guiding element is radially spaced from the inner periphery of the outer shell, providing a gap in the radial direction between the guiding element and the inner periphery of the outer shell, and the gap is filled with the filler. Thus, the guiding element and the inner periphery of the outer shell define the gap. By said gap, the filler is provided between the guiding element and the inner periphery of the outer shell, and the formation of any air pockets or voids between the guiding element and the outer shell is prevented. Voids or air pockets in the filler increase the risk of partial discharges. Thus, this embodiment provides for an improved bushing for medium and high voltage.

According to a further advantageous embodiment of the device according to the present invention, a plurality of support members are provided, each having a radial extension, and the support members are adapted to provide the gap between the guiding element and the inner periphery of the outer shell. This is an efficient way to space the guiding element from the outer shell, which still allows the filler to reach the gap therebetween. The support member can have several suitable designs, e.g. in the form of an elongated leg.

According to another advantageous embodiment of the device according to the present invention, at least two of the plurality of support members are circumferentially spaced apart. Hereby, the filler can efficiently fill the gap.

According to still another advantageous embodiment of the device according to the present invention, the support members are integral with the guiding element. As an alternative, the inner periphery of the outer shell can be provided with the support members. To facilitate the assembly of the device, the inner periphery of the outer shell, or the guiding element, can be provided with axial guiding grooves which are complementary to the support members, whereby the guiding element can be inserted and easily positioned in a correct position in said space.

According to yet another advantageous embodiment of the device according to the present invention, the device comprises a conductive member which is connected to the guiding element and extends through the outer shell and is exposed to the outside of the outer shell. Hereby, a conductive path between the guiding element and the exterior of the outer shell is provided in an efficient way, which efficiently enables measurements known to the person skilled din the art. Advantageously, the outer periphery of the guiding element is provided with a protrusion adapted to receive the conductive member. Hereby, the conductive member can be brought into a firm contact with the guiding element without penetrating the inner periphery of the guiding element.

According to another advantageous embodiment of the device according to the present invention, the conductive member is a self-tapping member adapted to penetrate the outer shell. Advantageously, the outer periphery of the outer shell is provided with a notch, and the guiding element and the inner periphery of the outer shell are designed in such a way, e.g. by a suitable arrangement of the guiding grooves and the support members, that the conductive member is received by the protrusion of the guiding element when it penetrates the outer shell at said notch.

According to an advantageous embodiment of the device according to the present invention, the guiding element is tubular and surrounds the voltage-carrying element. Hereby, an efficient shield for suppressing the electric field in the region of the outer contact surface of the outer shell is provided, which also facilitates the production and assembly of the device.

According to a further advantageous embodiment of the device according to the present invention, where the guiding element is tubular, the tubular guiding element defines a central axis, and the voltage-carrying element defines a longitudinal axis, wherein the central axis of the tubular guiding element is substantially collinear with the longitudinal axis of the voltage-carrying element. Hereby, an efficient shielding is provided.

According to another advantageous embodiment of the device according to the present invention, the device comprises a plurality of guiding elements provided in said space. By having at least two guiding elements provided in said space, which are electrically separated, advantageous shielding of the electric field is attained, and also advantageous measurements can be performed, e.g. voltage measurements.

According an advantageous embodiment of the device according to the present invention, at least one sensor element for measurement is provided in said space. Advantageously, the sensor element is situated somewhere along said section of said part of the axial extension of the voltage-carrying element. The sensor element can for example be in the form of a Hall sensor, or a Rogowski coil. Other suitable sensor elements can also be provided in said space. A plurality of sensor element, i.e. two or more sensor elements, can advantageously be provided in said space. The present invention provides flexibility in constructing for example a bushing, and makes is possible to easily adapt the bushing for different applications.

According to a further advantageous embodiment of the device according to the present invention, at least one guiding element is conductive and adapted to suppress the electric field in the region of the outer contact surface of the outer shell.

According to a further advantageous embodiment of the device according to the present invention, at least one guiding element is made of a field grading material, i.e. a material for grading or guiding the electric field. Examples of so called field grading material, FGM, which can be used are mentioned in WO-A1-2008/076058. This embodiment provides an improved bushing for medium and high voltage.

According to an advantageous embodiment of the device according to the present invention, said filler is in a solid state. Hereby, the filler contributes to the mechanical strength of the device, and the device is further improved.

According to a further advantageous embodiment of the device according to the present invention, said filler is a filler moulded and permitted to solidify in said space. Hereby, the filling of the space becomes easier and more accurate (no voids or air pockets left), and the production and assembly of the device is further improved.

According to another advantageous embodiment of the device according to the present invention, said filler comprises an elastomer. However, several other fillers are also possible.

According to yet another advantageous embodiment of the device according to the present invention, said filler comprises polyurethane as a main constituent. However, several other suitable polymers with satisfactory electrical properties are also possible.

According to still another advantageous embodiment of the device according to the present invention, the voltage-carrying element is exposed to and in contact with the filler. This provides for a facilitated and efficient bushing. Advantageously, the outer periphery of the voltage-carrying element is made of copper, which provides an advantageous adhesion between the voltage-carrying element, the filler, which advantageously comprises polyurethane, and the outer shell, which advantageously is made of polybutylene terephthalate (PBT). Since the filler is in direct contact with both the voltage-carrying element and the outer shell, the filler will act as a sealing agent, and will prevent $SF_6$ from leaving the container, which can include switchgear, and prevent humidity to enter the container. The voltage-carrying element can also be made of aluminum, or any other suitable conductive metal, or material.

According to an advantageous embodiment of the device according to the present invention, the voltage-carrying element has a modified surface for improved adhesion to the solid filler in the region in which it contacts the filler. Such a modification of the surface may include the application of any layer of material of better adherence to the filler, or a physical modification, e.g. a roughening of the surface, by any surface treatment.

According to an advantageous embodiment of the device according to the present invention, the device comprises a bushing, and the voltage-carrying element thereof is a conductor extending axially through said outer shell. Advantageously, the conductor is adapted to be connected to a cable outside the space defined between the conductor and the outer shell, and also outside a container wall of which the bushing protrudes. Advantageously, the outer shell defines a truncated cone narrowing towards that end region in which the outer shell is connected to the conductor. The conductor can for example comprise one or several busbars.

According to an advantageous embodiment of the device according to the present invention, the outer shell is formed by a thermoplastic polymer. The outer shell can be made of polybutylene terephthalate (PBT), polyester, or any other suitable thermoplastic.

According to a further advantageous embodiment of the device according to the present invention, the outer shell comprises connection means for connecting the outer shell to the voltage-carrying element, and the connection means are adapted to provide a press-fit between the outer shell and the voltage-carrying element. By the innovative connection means, the outer shell is efficiently attached to the voltage-carrying element, which can be a conductor. The connection means also facilitates the production of the device by efficiently and readily attaching the outer shell to the voltage-carrying element before and during the filling of the space with a filler moulded and permitted to solidify in said space. Hereby, an improved bushing for medium and high voltage is provided, and a bushing for medium and high voltage which can be produced in an efficient way is also provided.

The filler fills the entire cross-section of said space along said section, as seen in the axial, or longitudinal, direction of the outer shell, along said section. The outer contact surface defined herein is a surface against which a grounded wall of a container is to be connected, either directly or via any other element. Accordingly, the outer contact surface is located somewhere on the outer shell. Advantageously, the outer shell comprises a radial flange, advantageously in the same material is the rest of the outer shell, to which the wall of the container is to be connected. The position of the flange therefore generally corresponds to the position of the said outer contact surface and also the intersection plane of the wall through which the device is to protrude. Advantageously, the filler has a higher electrical insulating capacity than air, and advantageously higher than $SF_6$. Thereby, the filler will inhibit electrical discharges if there is a pressure drop of the $SF_6$ in the container.

According to another advantageous embodiment of the device according to the present invention, the connections means are situated somewhere along said section of said part of the axial extension of the voltage-carrying element.

According to yet another advantageous embodiment of the device according to the present invention, the outer shell extends axially with a space between its inner periphery and the outer periphery of the voltage-carrying element between a first end region and a second end region, where the connection means are provided in one of the end regions. By the providing the connection means in one of the end regions, a bushing which can be produced in a more efficient way is provided, which provides for an efficient filling of said space with the filler.

According to a further advantageous embodiment of the device according to the present invention, the connection means are integral with the outer shell. By this embodiment, an uncomplicated structure of the outer shell is provided, which provides for a facilitated and less expensive production of the outer shell, and consequently, a facilitated and less expensive production of the entire device.

According to another advantageous embodiment of the device according to the present invention, the connection means comprise at least one inner contact surface for contact with the outer periphery of the voltage-carrying element, the at least one inner contact surface being provided radially inwardly of the remainder of the inner periphery of the outer shell. By this embodiment, the connection means provide an efficient and uncomplicated press-fit between the outer shell and the voltage-carrying element. Advantageously, the connection means are adapted such that the at least one inner contact surface is biased against the voltage-carrying element.

According to still another advantageous embodiment of the device according to the present invention, the at least one inner contact surface surrounds the voltage-carrying element. By this embodiment, the press-fit provided by the connection means is further improved, and the production of the device is further facilitated by the surrounding inner contact surface, which seals the region of the connection means and prevents the filler from passing when it is in a liquid state.

According to yet another advantageous embodiment of the device according to the present invention, the connection means comprise a circumferential groove which has a radial extension and is formed around the voltage-carrying element, where the groove is radially outwardly of the at least one inner contact surface and opens into said space, and the groove is filled with the filler. By the groove, the press-fit produced by the connection means is further enhanced as the groove expands to a certain degree in the radial direction when filled with the filler, providing an increased pressure on the inner contact surface, and consequently, an increased pressure on voltage-carrying element, and consequently, a further improved press-fit. Hereby, an improved bushing for medium and high voltage is provided, and a bushing for medium and high voltage which can be produced in an efficient way is also provided.

Further, the inventors have found that if the groove is shallow enough, i.e. the axial extension of the groove is suitably short, the groove will be electrically shielded by the screen of an elbow contact to which the device is connected in a manner known to the person skilled in the art. Thus, in case any air pockets or voids would be present in the groove, partial discharges are prevented by the shielding of the screen of an elbow contact.

According to an advantageous embodiment of the device according to the present invention, the groove is annular and continuous in the circumferential direction, and surrounds the voltage-carrying element. By this embodiment, a further improved press-fit is attained. The groove is continuous in the sense that one groove surrounds the voltage-carrying element, and that there are no radial walls or struts which divide the groove in the circumferential direction.

According to a further advantageous embodiment of the device according to the present invention, where the device comprises the connection means, the outer shell has a circumferential edge which is folded inwardly to define said groove. This is an efficient way to produce the connection means and the groove of said connection means, and provides an efficient location of the connections means at one of the end regions of the outer shell, which improves and facilitates the production of the device. Hereby, an improved bushing for medium and high voltage is provided, and a bushing for medium and high voltage which can be produced in an efficient way is also provided.

Further, the above-mentioned objects of the present invention are attained by providing a method for producing a device according to any of the appended claims 1 to 20, or any of the embodiments of the device mentioned above, comprising the step of filling said space with a filler in a liquid state and permitting the filler to solidify, and the step of inserting the guiding element in said space prior to the filling of said space with the filler. Hereby, an efficient and uncomplicated method for producing a bushing for medium and high voltage is provided.

According to an advantageous embodiment of the method according to the present invention, the guiding element is radially spaced from the inner periphery of the outer shell, providing a gap in the radial direction between the guiding element and the inner periphery of the outer shell, and the gap is filled with the filler. Hereby, the filler is provided between the guiding element and the inner periphery of the outer shell, and any air pockets or voids between the guiding element and the outer shell are prevented. Voids or air pockets in the filler increase the risk of partial discharges. Thus, this embodiment provides for an improved bushing for medium and high voltage.

According to a further advantageous embodiment of the method according to the present invention, the method is characterized by the steps of penetrating the outer shell with a conductive member and bringing it into contact with the guiding element, and leaving a part of the conductive member exposed to the outside of the outer shell. This is an efficient way to provide a conductive path between the guiding element and the outside of the device.

According to another advantageous embodiment of the method according to the present invention, said penetration of the outer shell is performed by screwing the conductive member which is a self-tapping member. This is a further improved way to provide a conductive path between the guiding element and the outside of the device.

The above-mentioned objects of the present invention are also attained by providing an electric installation, comprising a container with a wall connected to ground, and a device for electric connection to an energy supply conductor for medium and/or high voltage, the device protruding through and being physically connected to said wall, characterized in that the device comprises the features mentioned in any of the appended claims 1 to 20, or the features of any of the above-mentioned advantageous embodiments.

Further advantageous embodiments of the device according to the present invention and further advantages with the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which:

FIG. 1 is a schematic side cross-section view of an embodiment of the device according to the present invention;

FIG. 2 is a schematic side view of an embodiment of the guiding element of the device according to the present invention;

FIG. 3 is a schematic top view of the guiding element of FIG. 2;

FIG. 4 is a schematic side cross-section view of an embodiment of the device according to the present invention during production;

FIG. 5 is a schematic side cross-section view of a second embodiment of the device according to the present invention, FIG. 6 is a schematic side cross-section view illustrating a third embodiment of the device according to the present invention, FIG. 7 is a schematic top view of alternative embodiments of guiding elements of the device.

DETAILED DESCRIPTION OF THE INVENTION

Figure 8:
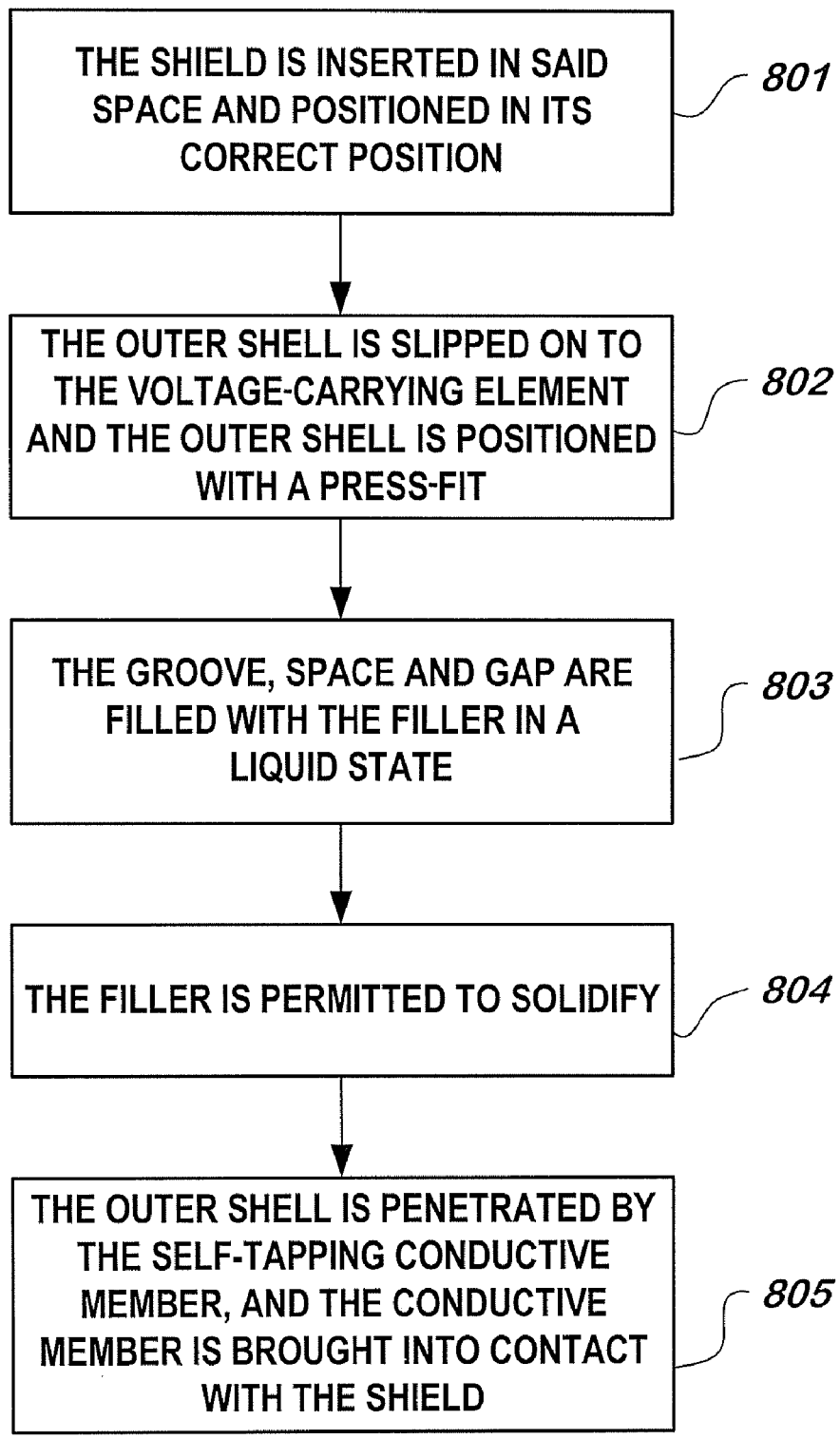
FIG. 8 is a flow chart illustrating aspects of the method according to the present invention.

FIG. 1 shows an embodiment of the device according to the present invention. The device is a bushing for electric connection to an energy supply conductor 101 for medium and/or high voltage, e.g. 12, 24 or 36 kV, such as a cable 101, and the device is adapted to protrude through and be mounted to a wall 102 of a container, wherein said wall 102 is grounded. The device comprises an electrically insulating part in the form of a tubular outer shell 104 and a voltage-carrying element 106 which is elongated, has the shape of a rod and has an outer periphery 108. The voltage-carrying element 106 is a conductor for conducting a current and is made of bare copper. The outer shell 104 has an inner periphery 110 and defines a longitudinal axis x-x, and the voltage-carrying element 106 extends in the axial direction of the outer shell 104. The outer shell 104 is formed by polybutylene terephthalate (PBT), but any other suitable thermoplastic can also be used, and defines a tubular element shaped as a truncated cone, and in its narrow first end region 112 the outer shell 104 is connected to the voltage-carrying element 106. On its outer periphery 114 the outer shell 104 is provided with a flange 116 presenting an outer contact surface 118 for connection to the wall 102 of the container and against which the wall 102 is to bear. The flange is attached to the wall 102 in conventional ways known to the skilled person, for example by means of bolts and holes provided in the flange 116. The outer shell 104 electrically insulates the voltage-carrying element 106 from the wall 102, and prevents any short circuit or electrical discharges between the voltage-carrying element 106 and the wall 102. The longitudinal axis x-x of the outer shell 104 extends substantially perpendicular to the plane of the wall 102. When the device is mounted to the wall 102, the voltage-carrying element 106 protrudes through an opening in the wall 102 to be connected to a cable 101 outside 126 the container space 120 enclosed by the wall 102 of the container and the device. Said container space 120 is here filled with $SF_6$.

From the first end region 112 where the outer shell 104 is connected to voltage-carrying element 106, the outer shell 104 extends along its longitudinal axis x-x and along at least a part of the axial extension of the voltage-carrying element 106, between the first end region 112 and a second end region 122 of the outer shell 104, with a space 124 between its inner periphery 110 and the outer periphery 108 of the voltage-carrying element 106. The outer shell 104 is adapted to separate the space 124 from an atmosphere outside 126 the container to which the device is connected. At least along a section of said part of the axial extension of the voltage-carrying element 106 the space 124 is filled with a filler 128 of an electrically insulating material other than that of the outer shell 104, the filler 128 completely filling the space 124 along said section. The filler 128 is in a solid state and has polyurethane as a main constituent. However, several other suitable polymers with satisfactory electrical properties are also possible. The outer contact surface 118 is provided at a position along said part of the axial extension of the voltage-carrying element 106.

In the first end region 112, the outer shell 104 comprises connection means, or a connection unit, for connecting the outer shell 104 to the voltage-carrying element 106, and the connection means are adapted to provide a press-fit, or interference fit, between the outer shell 104 and the voltage-carrying element 106. The connection means comprise an inner contact surface 130 for contact with the outer periphery 108 of the voltage-carrying element 106, and the inner contact surface 130 is provided radially inwardly of the remainder of the inner periphery 110 of the outer shell 104. The inner contact surface 130 is adapted to be biased against the voltage-carrying element 106. The inner contact surface 130 surrounds the voltage-carrying element 106 around the entire circumference of the voltage-carrying element 106. The outer periphery 108 of the voltage-carrying element 106 is exposed to and in contact with the filler 128 with the exception of the contact between the inner contact surface 130 and the voltage-carrying element 106. Further, the connection means comprise a circumferential groove 132 which has a radial extension and is formed around the voltage-carrying element 106. The groove 132 is radially outwardly of the inner contact surface 130 and opens into said space 124, and the groove 132 is filled with the filler 128. The groove 132 has a substantially U-shaped cross-section in the circumferential direction, and is annular and continuous in the circumferential direction. The groove 132 surrounds the voltage-carrying element 106 around the entire circumference of the voltage-carrying element 106. The outer shell 104 has a circumferential edge 134 in the first end region 112 which is folded inwardly to define the groove 132, and consequently, the groove 132 and the inner contact surface 130 of the connection means are integral with the outer shell 104. The circumferential edge 134 is folded to provide for said press-fit, or interference fit, between the inner contact surface 130 and the outer periphery 108 of the voltage-carrying element 106. In the second end region 122, a barrier element can be provided which encloses and delimits said space 124.

In the first end region 112, the voltage-carrying element 106 is adapted to be electrically connected to the energy supply conductor 101, such as a cable. The connection between the voltage-carrying element 106 and the energy supply conductor 101 is performed in ways known to the skilled person.

The device comprises an axially extending conductive guiding element 136 for guiding the electric field produced by the voltage-carrying element 106, in the form of a shielding element 136 for suppressing the electric field in the region of the outer contact surface 118 of the outer shell 104. The electric field is produced by the voltage-carrying element 106. The shielding element 136 is provided in said space 124. Herein, the shielding element 136 is made of a conductive polymer, but any suitable conducting material can be used, such a suitable conducting metal. The shielding element 136 is provided adjacent to the wall 102 of the container when the device is connected thereto. The shielding element 136 is radially spaced from the inner periphery 110 of the outer shell 104, providing a gap 138 in the radial direction between the shielding element 136 and the inner periphery 110 of the outer shell 104, and the gap 138 is filled with the filler 128.

With reference to FIGS. 2 and 3, the shielding element 136 is tubular and surrounds the voltage-carrying element 106, and the shielding element 136 is provided with a plurality of support members 140, each having a radial extension. Herein, the support members 140 include three pairs of support members 140, and the three pairs are evenly distributed and spaced from each other in the circumferential direction. The support members 140 are adapted to provide the gap 138 between the shielding element 136 and the inner periphery 110 of the outer shell 104. Advantageously, the support members 140 are integral with the shielding element 136 and moulded together with the shielding element 136. However, it is to be understood that the support members can have other designs, and can be attached to the shielding element by other means.

The device comprises a conductive member 142, in the form of a screw in a suitable conductive metal, such as copper, or a conductive polymer etc., which is connected to the shielding element 136 and extends through the outer shell 104 to the outside 126 and the outer periphery 114 of the outer shell 104. The conductive member 142 is a self-tapping member adapted to penetrate the outer shell 104. By means of the conductive member 142, measurements known to the skilled person can be performed in an efficient way. The outer periphery of the shielding element 136 is provided with a protrusion 144 adapted to receive the conductive member 142.

FIG. 5 schematically illustrates a second embodiment of the device according to the present invention, based on the device of FIG. 1. The second embodiment corresponds to the embodiment of FIG. 1, but is in addition provided with a second guiding element 502 for guiding the electric field produced by the voltage-carrying element 106. The second guiding element 502 is provided in said space 124 and is embedded in the filler 128. The second guiding element 502 is in the form of a conductive shielding element 502 for suppressing the electric field produced by the voltage-carrying element 106 and its design corresponds to the design of the first guiding element 136. However, the structure of the second guiding element 502 can naturally differ from the structure of the first guiding element 136. In addition, the device of FIG. 5 is provided with a sensor element 504 for measurement in said space 124. The sensor element 504 is here in the form of a Rogowski coil surrounding the voltage-carrying element 106. The Rogowski coil is known to the person skilled in the art. However, any other suitable sensor element can also be provided in said space 124 and in the filler 128. A member corresponding to the conductive member 142 can be used to connect the sensor element 504 and the second guiding element 502 to the outside of the outer shell 104. It is to be understood that other positions of the sensor element 504 and the guiding elements 136, 502 are possible within the space 124.

FIG. 6 schematically illustrates a third embodiment of the device according to the present invention, based on the device of FIG. 1. The third embodiment corresponds to the embodiment of FIG. 1, but the space 124 of the third embodiment is in addition provided with a second guiding element 602 for guiding the electric field produced by the voltage-carrying element 106. The second guiding element 602 of the third embodiment is tubular and is made of a field grading material, FGM, of a kind mentioned in WO-A1-2008/076058, and is at least partly embedded by the filler 128. The second guiding element 602 is shaped as a truncated cone having its largest diameter towards the first guiding element 136 and its smallest diameter in the second end region 122. Here, the cone is provided with a basis 604 connected to the voltage-carrying element 106, however, this basis 604 can also be excluded. The space between the walls of the second guiding element 602 and the voltage-carrying element 106 is filled with the filler 128. The second guiding element 602 could also have a solid structure made of the field grading material. Other shapes of the second guiding element 602, for example cylindrical, are also possible. By introducing the second guiding element 602 made of the field grading material into the space 124, a more advantageous distribution of the electric field is provided, which reduces the electric stress on the device.

In FIG. 7, an alternative embodiment of guiding elements of the device is shown. This embodiment is formed based on the guiding element 136 shown in FIG. 3 but has been axially cut to form two half-cylindrical guiding elements 136a, 136b, and both of them are provided with a protrusion 144a, 144b adapted to receive a conductive member. The two half-cylindrical guiding elements 136a, 136b are separated by spaces 702. These spaces 702, indicated by broken lines in FIG. 7, could as an alternative be filled with a non-conductive material which joins the two half-cylindrical guiding elements 136a, 136b together, forming a single tubular shape, which facilitates the assembly. The guiding elements 136a, 136b of FIG. 7 are suitably positioned at corresponding positions in the space 124 of the device as the guiding element 136 is positioned the space 124, illustrated in FIG. 1.

FIG. 8 shows a flow chart illustrating aspects of the method according to the present invention, for producing the above-mentioned device, comprising the following steps: The shielding element 136 is inserted in said space 124 and positioned in its correct position, at step 801, radially spaced from the inner periphery 110 of the outer shell 104, providing a gap 138 in the radial direction between the shielding element 136 and the inner periphery 110 of the outer shell 104. The outer shell 104 is slipped on to the voltage-carrying element 106 and the outer shell 104 is positioned with a press-fit between itself and the voltage-carrying element 106, at step 802. The space 124 between the voltage-carrying element 106 and the outer shell 104 is filled with the filler 128 in a liquid state, at step 803, as illustrated in FIG. 3. The filling operation is generally performed in ways known to the skilled person. First, the groove 132 is filled with the filler, and subsequently, the rest of the space 124 is filled, and at the same time the gap 138 is filled with the filler 128. The filler 128 is permitted to solidify, at step 804, using the outer shell 104 as a mould. The outer shell 104 is penetrated by the self-tapping conductive member 142 by screwing it, and the conductive member 142 is brought into contact with the shielding element 136, at step 805, leaving a part of the conductive member 142 exposed to the outside of the outer shell 104.

The container and the internal connection of the device with bus bars, or conductors, inside the container are carried out in ways known to the person skilled in the art.

The invention shall not be considered limited to the embodiments illustrated, but can be modified and altered in many ways by one skilled in the art, without departing from the scope of the appended claims.

What is claimed is:

1. A device for electric connection to an energy supply conductor for medium and/or high voltage comprising:
    a voltage-carrying element with an outer periphery;
    a tubular outer shell with an inner periphery, the tubular outer shell defining a longitudinal axis (x-x) and being formed by a polymer and connected to the voltage-carrying element,
    the voltage-carrying element extending in the axial direction of the outer shell, and along at least a part of the axial extension of the voltage-carrying element, the outer shell extends axially with a space between its inner periphery and the outer periphery of the voltage-carrying element,
    the outer shell being provided with an outer contact surface for connection to a wall of a container somewhere along said part of the axial extension of the voltage-carrying element,
    the outer shell is being adapted to separate the space from an atmosphere outside the container in which the device is connected, and
    at least along a section of said part of the axial extension of the voltage-carrying element the space is filled with a filler of an electrically insulating material other than that of the outer shell, the filler completely filling the space along said section;
    at least one guiding element for guiding the electric field produced by the voltage-carrying element, the guiding element being at least partly conductive and provided in said space,
    the guiding element being radially spaced from the inner periphery of the outer shell, providing a gap in the radial direction between the guiding element and the inner periphery of the outer shell, the gap being filled with the filler; and
    a plurality of support members are provided, each having a radial extension, and the support members are adapted to provide the gap between the guiding element and the inner periphery of the outer shell, such that the support members are integral with the guiding element.

2. The device of claim 1, wherein the guiding element is axially extending and forms a screen.

3. The device of claim 1, wherein the guiding element is situated somewhere along said section of said part of the axial extension of the voltage-carrying element.

4. The device of claim 1, wherein at least two of the plurality of support members are circumferentially spaced apart.

5. The device of claim 1, further comprising a conductive member which is connected to the guiding element and extends through the outer shell, and is exposed to the outside of the outer shell for measurement.

6. The device of claim 5, wherein the conductive member is a self-tapping member adapted to penetrate the outer shell.

7. The device of claim 1, wherein the guiding element is tubular and surrounds the voltage-carrying element.

8. The device of claim 7, wherein the tubular guiding element defines a central axis, and the voltage-carrying element defines a longitudinal axis, and in that the central axis of the tubular guiding element is substantially collinear with the longitudinal axis of the voltage-carrying element.

9. The device of claim 1, wherein a plurality of guiding elements provided in said space.

10. The device of claim 1, wherein at least one guiding element is conductive and adapted to suppress the electric field in the region of the outer contact surface of the outer shell.

11. The device of claim 1, wherein at least one guiding element is made of a field grading material.

12. The device of claim 1, wherein said filler is in a solid state.

13. The device of claim 1, wherein the voltage-carrying element is exposed to and in contact with the filler.

14. The device of claim 1, wherein the outer shell is formed by a thermoplastic polymer.

15. The device of claim 1, wherein the voltage-carrying element thereof is a conductor extending axially through said outer shell.

16. The device of claim 1, wherein the outer shell includes connection means for connecting the outer shell to the voltage-carrying element, and in that the connection means are adapted to provide a press-fit between the outer shell and the voltage-carrying element.

17. The device of claim 16, wherein the connections means are situated somewhere along said section of said part of the axial extension of the voltage-carrying element.

18. A method for producing a device according to claim 1, comprising:
    filling said space with said filler in a liquid state and permitting the filler to solidify,
    inserting the guiding element in said space prior to the filling of said space with the filler, wherein the guiding element is radially spaced from the inner periphery of the outer shell, and
    providing said gap in the radial direction between the guiding element and the inner periphery of the outer shell, wherein the gap is filled with the filler.

19. The method of claim 18, further comprising penetrating the outer shell with a conductive member and bringing the outer shell into contact with the guiding element, and leaving a part of the conductive member exposed to the outside of the outer shell.

20. The method of claim 19, wherein the step of penetration of the outer shell is performed by screwing the conductive member which is a self-tapping member.

21. An electric installation comprising:
    said container with said wall connected to ground, and
    said device for electric connection to said energy supply conductor, the device protruding through and being physically connected to said wall, wherein the device comprises the features mentioned in claim 1.

* * * * *